(12) United States Patent
Murphy et al.

(10) Patent No.: US 12,521,453 B2
(45) Date of Patent: Jan. 13, 2026

(54) MILD AND SITE-SELECTIVE 18F-LABELING OF SMALL MOLECULES AND/OR BIOMOLECULES VIA A THIOL-REACTIVE SYNTHON

(71) Applicant: The Regents of the University of California, Oakland, CA (US)

(72) Inventors: Jennifer M. Murphy, Los Angeles, CA (US); Gaoyuan Ma, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 717 days.

(21) Appl. No.: 17/253,430

(22) PCT Filed: Jun. 28, 2019

(86) PCT No.: PCT/US2019/039929
§ 371 (c)(1),
(2) Date: Dec. 17, 2020

(87) PCT Pub. No.: WO2020/009945
PCT Pub. Date: Jan. 9, 2020

(65) Prior Publication Data
US 2022/0072163 A1     Mar. 10, 2022

Related U.S. Application Data

(60) Provisional application No. 62/693,758, filed on Jul. 3, 2018.

(51) Int. Cl.
*A61K 51/04* (2006.01)
*A61K 51/08* (2006.01)
*C07B 59/00* (2006.01)
*C07D 233/70* (2006.01)

(52) U.S. Cl.
CPC ........ *A61K 51/0453* (2013.01); *A61K 51/088* (2013.01); *C07B 59/002* (2013.01); *C07D 233/70* (2013.01); *C07B 2200/05* (2013.01)

(58) Field of Classification Search
CPC .............. A61K 51/0453; A61K 51/088; C07B 59/002; C07B 2200/05; C07D 233/70
USPC ....................................................... 424/1.89
See application file for complete search history.

(56) References Cited

U.S. PATENT DOCUMENTS

| 2004/0236085 A1 | 11/2004 | Uthra et al. |
| 2005/0049487 A1 | 3/2005 | Johnson et al. |
| 2016/0015838 A1 | 1/2016 | Li et al. |
| 2016/0272593 A1 | 9/2016 | Ritter et al. |

FOREIGN PATENT DOCUMENTS

WO     2015058047 A2     4/2015

OTHER PUBLICATIONS

Kantner University of Bath-Dissertation, 2015, 1-296. (Year: 2015).*
Extended European Search Report dated Mar. 2, 2022 for EP Application No. 19831059.1.
Flanagan Mark E. et al: "Chemical and Computational Methods for the Characterization of Covalent Reactive Groups for the Prospective Design of Irreversible Inhibitors", Journal of Medicinal Chemistry, vol. 57, No. 23, Dec. 11, 2014 (Dec. 11, 2014), pp. 10072-10079.
Horner L et al.: "Fluoreszierende Uno Night Fluoreszierende (Aryl)(Vinyl)Sulfone—Reagenzien Zum Schutz Uno Nachweis Von Thiolfunktionen", Liebigs Annalen Der Chemie, Verlag Chemie Gmbh. Weinheim, DE, No. 1, Jan. 1, 1985 (Jan. 1, 1985), pp. 22-33.
Lee, E et al.: "Nickel-Mediated Oxidative Fluorination for PET with Aqueous [18F] Fluoride", Journal of the American Chemical Society, vol. 134, No. 42, 2012, pp. 17-456 to 17-458.
Lee, E et al., Nickel-Mediated Oxidative Fluorination for PET with Aqueous [18F] Fluoride, Journal of the American Chemical Society 134(42), pp. 1-7 (pp. 17456-17458), 2012.
PCT International Search Report and Written Opinion dated Sep. 18, 2019 for PCT Application No. PCT/US2019/39929.

* cited by examiner

*Primary Examiner* — Michael G. Hartley
*Assistant Examiner* — Sean R Donohue
(74) *Attorney, Agent, or Firm* — Gates & Cooper LLP

(57) ABSTRACT

Site-selective conjugation to biomolecules via thiol-based chemistry is superior to the unselective modification of lysine residues, which produce a mixed product and can potentially interfere with binding affinity of the biomolecule. However, in physiological environments, the maleimide-thiol conjugation product which is the current gold-standard for site-selective thiol-conjugation can be susceptible to hydrolysis or a retro-Michael reaction via exchange with reactive thiols such as those in albumin or glutathione residues yet the degradation is relatively slow. Therefore, for in vivo studies, the maleimide-thiol conjugation proposes instability issues. The compositions and methods disclosed herein provide an alternative thiol-based linkage, one that overcomes the instability issues with conventional reagents and methods. The compositions and methods disclosed herein are useful in various contexts, for example, for $^{18}$F-labeling of peptides/proteins in the preparation of positron emission tomography (PET) probes.

18 Claims, 10 Drawing Sheets

MILD AND SITE-SELECTIVE 18F-LABELING OF SMALL MOLECULES AND/OR BIOMOLECULES VIA A THIOL-REACTIVE SYNTHON

CROSS REFERENCE TO RELATED APPLICATIONS

This application claims the benefit under 35 U.S.C. Section 119(e) of commonly-assigned U.S. Provisional Patent Application Ser. No. 62/693,758, filed on Jul. 3, 2018, and entitled "MILD AND SITE-SELECTIVE $^{18}$F-LABELING OF SMALL MOLECULES AND/OR BIOMOLECULES VIA A THIOL-REACTIVE SYNTHON" which application is incorporated by reference herein.

TECHNICAL FIELD

This disclosure relates to methods and materials useful for $^{18}$F-labeling of biomolecules such as peptides and proteins.

BACKGROUND OF THE INVENTION

Positron Emission Tomography (PET) has become one of the most prominent functional imaging modalities in diagnostic medicine, with very high sensitivity, high resolution and tissue accretion that can be adequately quantitated. Although compounds such as [$^{18}$F]-deoxy-2-fluoro-D-glucose are widely used as PET imaging agent in fields such as oncology, there is need for other labeled compounds for functional imaging to complement and augment various anatomic imaging methods. Thus, there is a need to have facile methods of conjugating positron emitting radionuclides to various molecules of biological and medical interest.

Conventionally, $^{18}$F is attached to compounds by binding it to a carbon atom (see, e.g., Miller et al., 2008, Angew Chem Int Ed 47:8998-9033). Binding to carbon usually involves multistep syntheses, including multiple purification steps, which is problematic for an isotope with a 110-min half-life, and typically results in poor radiochemical yields. Current methods for $^{18}$F-labeling of peptides typically involve the labeling of a reagent at low specific activity, HPLC purification of the reagent and then conjugation to the peptide of interest. The conjugate is often repurified after conjugation to obtain the desired specific activity of labeled peptide.

An example of the conventional technology is the labeling method of Poethko et al. (see, e.g., J. Nucl. Med. 2004; 45:892-902) in which 4-[$^{18}$F]fluorobenzaldehyde is first synthesized and purified (see, e.g. Wilson et al, J. Labeled Compounds and Radiopharm. 1990; XXVIII: 1189-1199) and then conjugated to the peptide. The peptide conjugate is then purified by HPLC to remove excess peptide that was used to drive the conjugation to completion. Other examples include labeling with succinimidyl [$^{18}$F]fluorobenzoate (SFB) (see, e.g., Vaidyanathan et al., 1992, Int. J. Rad. Appl. Instrum. B 19:275), other acyl compounds (see, e.g., Tada et al., 1989, Labeled Compd. Radiopharm.XXVII: 1317; Wester et al., 1996, Nucl. Med. Biol. 23:365; Guhlke et al., 1994, Nucl. Med. Biol 21:819), or click chemistry adducts (see, e.g., Li et al., 2007, Bioconj Chem. 18:1987). Conventional thiol-reactive bioconjugations are typically conducted with maleimide-based synthons. These reactions enable a site-selective thiol linkage via Michael addition between a sulfhydryl and a maleimide group, forming a succinimidyl thioether linkage. However, the conjugate exhibits low stability in physiological conditions and is susceptible to a Retro-Michael addition reaction, regenerating back the free sulfhydryl and the maleimide synthon. These methods are also tedious to perform and not conducive to kit formulations that could routinely be used in a clinical setting.

A need exists for a rapid, simple method of $^{18}$F labeling of targeting moieties, such as proteins or peptides, preferably at high radiochemical yield, which results in targeting constructs of suitable specific activity and in vivo stability for detection and/or imaging, while minimizing the requirements for specialized equipment or highly trained personnel and reducing operator exposure to high levels of radiation. More preferably a need exists for methods of preparing new $^{18}$F-labeled biomolecules for use in PET technologies. A further need exists for prepackaged kits that could provide compositions required for performing such methods.

SUMMARY OF THE INVENTION

Positron emission tomography (PET) continues to gain popularity in clinical settings due to the ability of this technology to identify or evaluate a variety of pathological conditions, including many cancers, heart disease and brain disorders. Advantageously, PET scans can sometimes detect diseases before they show up in other imaging procedures. The compounds and associated methods disclosed herein provide a new avenue for creating PET probes that have a number of advantages over conventional molecules and technologies. As positron emission tomography is gaining recognition as a technology having broad clinical applications, the compounds and methods disclosed herein may be useful to further the diagnostic and associated powers of PET technologies by providing a new class of stable probes for this emerging medical field.

As discussed in detail below, we have designed compositions and methods that provide alternative routes for site-selective conjugation to biomolecules via thiol-based chemistry linkage. The methods and materials disclosed herein are designed to overcome stability issues that are observed with conventional reagents and methods in this field of technology.

Embodiments of the invention include compositions of matter comprising a compound having the general formula:

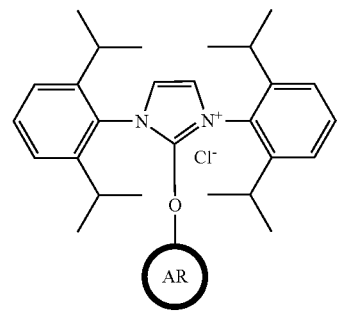

wherein AR comprises a moiety having at least one unsubstituted, substituted and/or functionalized aryl ring to which

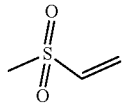

is coupled. Compounds having these structures exhibit a constellation of atomic moieties (e.g. [18]F and S) that are disposed in the chemical architecture in a manner that allow such compounds to be used to form vinyl sulfone compounds that are useful in conjugation methodologies to label molecules having thiol groups (e.g. polypeptides) with [18]F. As discussed below, other embodiments of the invention include methods of coupling a $^{18}$F moiety to a biomolecule to form a $^{18}$F-biomolecule conjugate comprising combining the biomolecule with at least one compound disclosed herein; and performing a Michael addition reaction so that the $^{18}$F moiety is coupled to the biomolecule, thereby forming a $^{18}$F-biomolecule conjugate.

The thiol-reactive synthons disclosed herein can be made in one-step with only one HPLC purification, providing higher yields and shorter production times, and are easy to characterize via HPLC. In addition, conventional $^{18}$F-vinyl sulfones have the F-18 bound to an alkyl carbon chain, which is known to be less stable in vivo than the F-18 being bound to an aromatic carbon ring. In the vinyl sulfones disclosed herein, the F-18 is bound to the aromatic carbon ring in order to make them more stable in vivo. The compositions and methods disclosed herein are useful in various contexts, for example, for $^{18}$F-labeling of peptides/proteins in the preparation of positron emission tomography (PET) probes.

Other objects, features and advantages of the present invention will become apparent to those skilled in the art from the following detailed description. It is to be understood, however, that the detailed description and specific examples, while indicating some embodiments of the present invention, are given by way of illustration and not limitation. Many changes and modifications within the scope of the present invention may be made without departing from the spirit thereof, and the invention includes all such modifications.

DETAILED DESCRIPTION OF THE INVENTION

Figure 1:
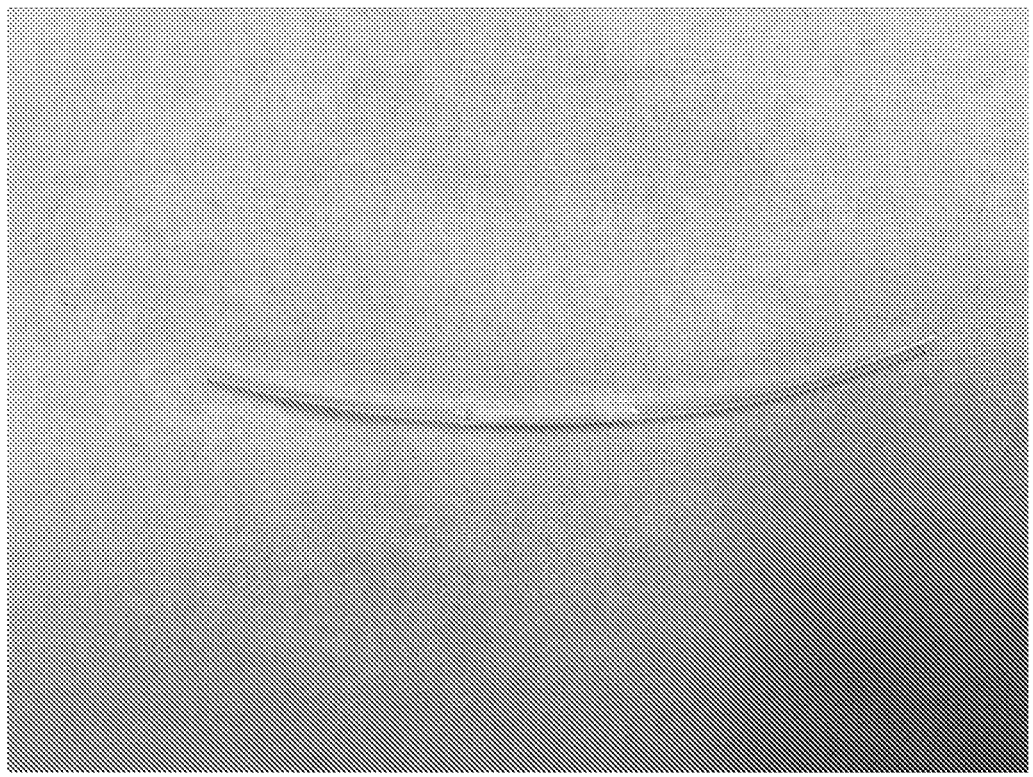
FIG. 1. Photograph of ion exchange cartridges useful with embodiments of the invention.

In the description of embodiments, reference may be made to the accompanying figures which form a part hereof, and in which is shown by way of illustration a specific embodiment in which the invention may be practiced. It is to be understood that other embodiments may be utilized and structural changes may be made without departing from the scope of the present invention. Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art. Many of the aspects of the techniques and procedures described or referenced herein are well understood and commonly employed by those skilled in the art.

As discussed in detail below, we have designed compositions and methods that provide alternative routes for site-selective conjugation to biomolecules via thiol-based chemistry linkage. The methods and materials disclosed herein are designed to overcome stability issues that are observed with conventional reagents and methods in this field of technology. The following provides a number of illustrative embodiments of the invention.

Embodiments of the invention include compositions of matter comprising a compound having the general formula:

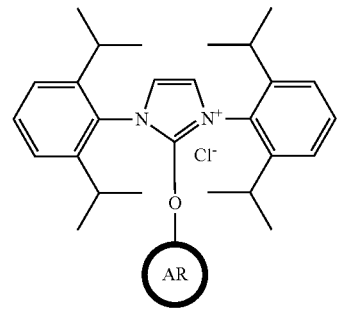

wherein AR comprises a moiety having at least one unsubstituted, substituted and/or functionalized aryl ring to which

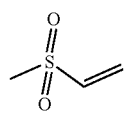

is coupled.

Optionally this composition comprises at least one compound selected from A', B', C', D', E', F', G', H', I', J', K', L', M' and N' in Table 1 below. Compounds having these structures exhibit a constellation of atomic moieties (e.g. [18]F and S) that are disposed in the chemical architecture in a manner that allow such compounds to be used to form vinyl sulfone compounds that are useful in conjugation methodologies (e.g. Michael additions) to label molecules having thiol groups (e.g. polypeptides) with [18]F. In typical embodiments of the invention, these compounds are in a powdered form. In certain embodiments of the invention, these compounds comprise at least 90% of the composition (i.e. these compounds exhibit an at least 90% purity). In certain embodiments, the composition is disposed within a container of a kit. Some embodiments of the invention include these compounds combined with additional reagents. For example, in some embodiments of the invention, these compounds are combined with an organic solvent. In some embodiments of the invention, these compounds are combined with [$^{18}$F]fluoride molecules.

Embodiments of the invention also include compositions of matter comprising a vinyl sulfone compound having the general formula:

wherein AR comprises a moiety having at least one unsubstituted, substituted and/or functionalized aryl ring to which $^{18}$F— and/or

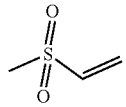

is coupled. Optionally this composition comprises at least one compound selected from A, B, C, D, E, F, G, H, I, J, K, L, M and N in Table 2 below. Compounds having these structures exhibit a constellation of atomic moieties (e.g. $^{18}$F and S) that are disposed in the chemical architecture in a manner that allow such compounds to be used in conjugation methodologies (e.g. Michael additions) to label biomolecules having thiol groups (e.g. polypeptides) with $^{18}$F. In certain embodiments of the invention, these compositions further comprise a biomolecule having a —SH moiety. Optionally, the biomolecule comprises a peptide, a protein or a sugar.

Another embodiment of the invention is a method of making a $^{18}$F labelled vinyl sulfone comprising combining a [$^{18}$F]fluoride molecule with at least one compound disclosed herein (e.g. those disclosed in Table 1); and performing a fluorination reaction so that a $^{18}$F labelled vinyl sulfone is made.

Yet another embodiment of the invention is a method of coupling a $^{18}$F moiety to a biomolecule to form a $^{18}$F-biomolecule conjugate comprising combining the biomolecule with at least one compound disclosed herein (e.g. those disclosed in Table 2); and performing a Michael addition reaction so that the $^{18}$F moiety is coupled to the biomolecule, thereby forming a $^{18}$F-biomolecule conjugate. Optionally in these methods the biomolecule comprises a peptide, a protein or a sugar.

Embodiments of the invention also include using the $^{18}$F-biomolecule conjugate in a positron emission tomography process to image an in vivo environment, for example an in vivo environment in a patient diagnosed with a disease or pathology. In certain embodiments of the invention, the disease or pathology is one characterized by disregulated cellular growth. In this context, positron emission tomography (PET) is an important nuclear medicine diagnosis technology. The radioisotope ($^{18}$F) it uses has a relatively long half-live ($t_{1/2}$=110 min) and so has time enough for labeling and diagnosis. Its hydrogen similar property does not involve obvious changes on the space structure and bioactivity of labeled molecular. Hence, $^{18}$F is widely used as a radio imaging agent to label ligand molecular of glucose, amino acid, fatty acid, nucleoside and receptor. PET is used to detect metabolism, protein synthesis and neurotransmitter functional activity and to diagnose tumor, cardiovascular disease, nervous disease and psychosis. Thus, $^{18}$F is very important to the developments of bio-functional imaging and molecular nuclear medicine. A variety of PET methodologies are well known in the art and disclosed for example in U.S. Patent Publication Nos. 20170153337, 20180236111, 20180340001, and 20180344274, and "PET/MRI: Methodology and Clinical Applications" 1st ed. 2014 by Ignasi Carrio (Editor) and Pablo Ros (Editor).

Another embodiment of the invention is a system or kit for use in a positron emission tomography methodology comprising a container having a composition shown in Table 1. Typically in these systems or kits, the compound is in a powdered form; and/or the compound comprises at least 90% of the composition. Optionally these systems or kits further comprise an ion exchange cartridge (e.g. one having from 2 to 5 milligrams of a resin composition). In some embodiments of the invention, the systems or kits further include a container comprising a solvent.

Embodiments of the invention can use a number of conventional method steps and materials. Methodological steps and reagents that can be adapted for use with embodiments of the invention are described, for example, in U.S. Patent Publication Nos. 20020119096, 20060110787, 20050192458, 20080058344, 20090257953 and 20170283442. In addition, Neumann et al., Nature 2016 534(7607): 369-73 shows one methodology useful to synthesizes the F-18 vinyl sulfones disclosed herein. Morales-Sanfrutos et al., Org Biomol Chem. 2010 Feb. 7; 8(3): 667-75 shows how vinyl sulfone can be used as a chemical entity to conjugate various "labels" to biomolecules (labels being fluorescent dye, sugar molecule, biotin, etc). Scheme 2 in this article illustrates this concept. The vinyl sulfone molecules disclosed herein can be added to this class of molecules in that they enable the labeling of a biomolecule with fluorine-18, via a vinyl sulfone ligation. Wu et al., J Nucl Med. 2014 July; 55(7): 1178-84 also discloses a vinyl sulfone for F-18 labeling. However, the chemical structure is significantly different and the synthesis and purification of this thiol-reactive synthon is lengthy, causing low yields of the final product. Also, the characterization is difficult because the compound of this disclosure has no UV chromophore.

ASPECTS AND ELEMENTS OF THE INVENTION

Figure 2:
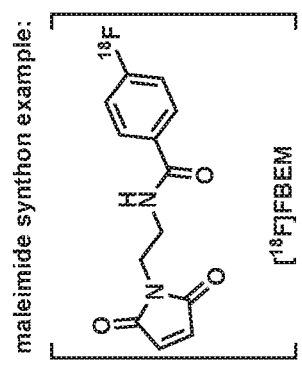
FIG. 2. Cartoon schematic of Michael addition and Retro-Michael addition reactions.
Figure 2:
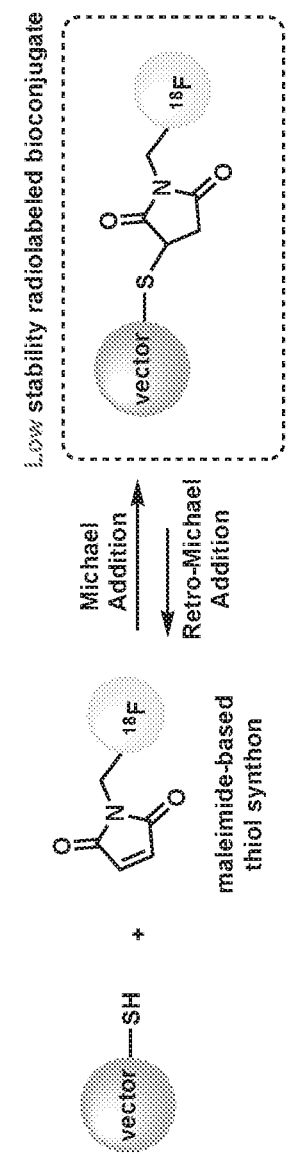

We have developed fluorine-18 labeled vinyl sulfones (e.g. [$^{18}$F]-1-fluoro-4-(vinylsulfonyl)benzene, [$^{18}$F]FVSB) as thiol-reactive synthons for the site-specific radiolabeling of small molecules or biomolecules, for applications in positron emission tomography (PET) molecular imaging. Currently, the gold-standard for thiol-reactive bioconjugations are conducted with maleimide-based synthons. These reactions enable a site-selective thiol linkage via Michael addition between a sulfhydryl and a maleimide group, forming a succinimidyl thioether linkage. However, the conjugate exhibits low stability in physiological conditions and is susceptible to a Retro-Michael addition reaction, regenerating back the free sulfhydryl and the maleimide synthon. In this reversible reaction, other thiol-containing molecules have the opportunity to react with the maleimide and thereby joining the fluorine-18 radioisotope with unwanted side-products (see, e.g. the schematic shown in FIG. 2).

Figure 3:
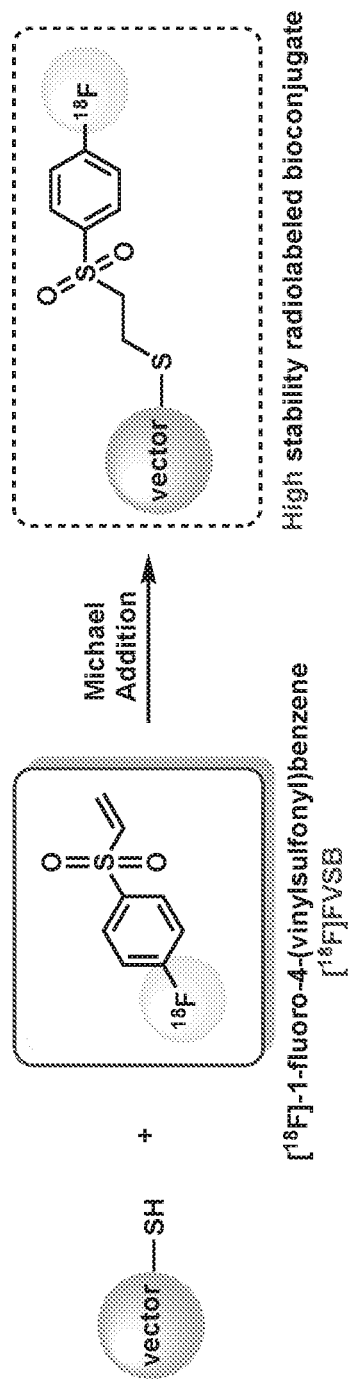
FIG. 3. Cartoon schematic of a Michael addition reaction with thioester linkages.

To overcome the instability issues, other types of thioether linkages have been reported, most notably tosylates, bromo- and iodo-acetyls (see, e.g. the schematic shown in FIG. 3). However, these options have lower reaction rates with thiol and also high reactivity with other amino acids.

Figure 4:
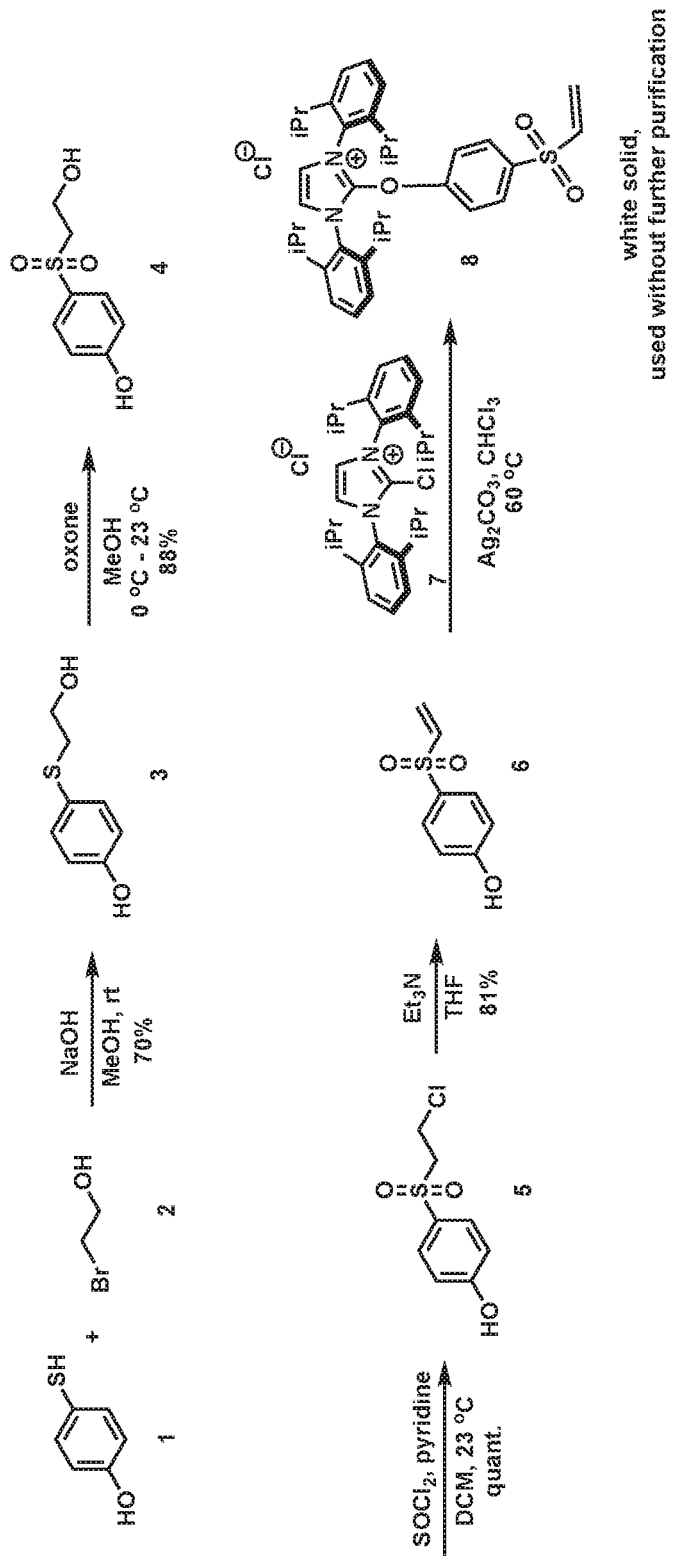
FIG. 4. Cartoon schematic of Scheme 1, showing preparation and labelling of precursor 8.

$^{18}$F-Labeling Precursor Preparation:

Synthesis of the [$^{18}$F]-1-fluoro-4-(vinylsulfonyl)benzene ([$^{18}$F]FVSB) illustrative embodiment was achieved following a deoxyfluorination of phenols methodology reported in literature (C. N. Neumann, J. M. Hooker, T. Ritter, *Nature* 2016, 534, 369-373). In four steps, starting from thiophenol 1, the vinyl sulfonyl phenol 6 was obtained. To a vial containing 7 (1 equiv), Ag$_2$CO$_3$ (0.5 equiv) and phenol 6 (1 equiv), chloroform (2 mL/mmol phenol) was added and the resulting suspension was allowed to stir at 60° C. for 4 hours. The precipitate was removed by filtration and the filtrate was dried under vacuum to obtain the labeling precursor 8, which was used without further purification (see Scheme 1 as shown in FIG. 4).

Figure 5A:
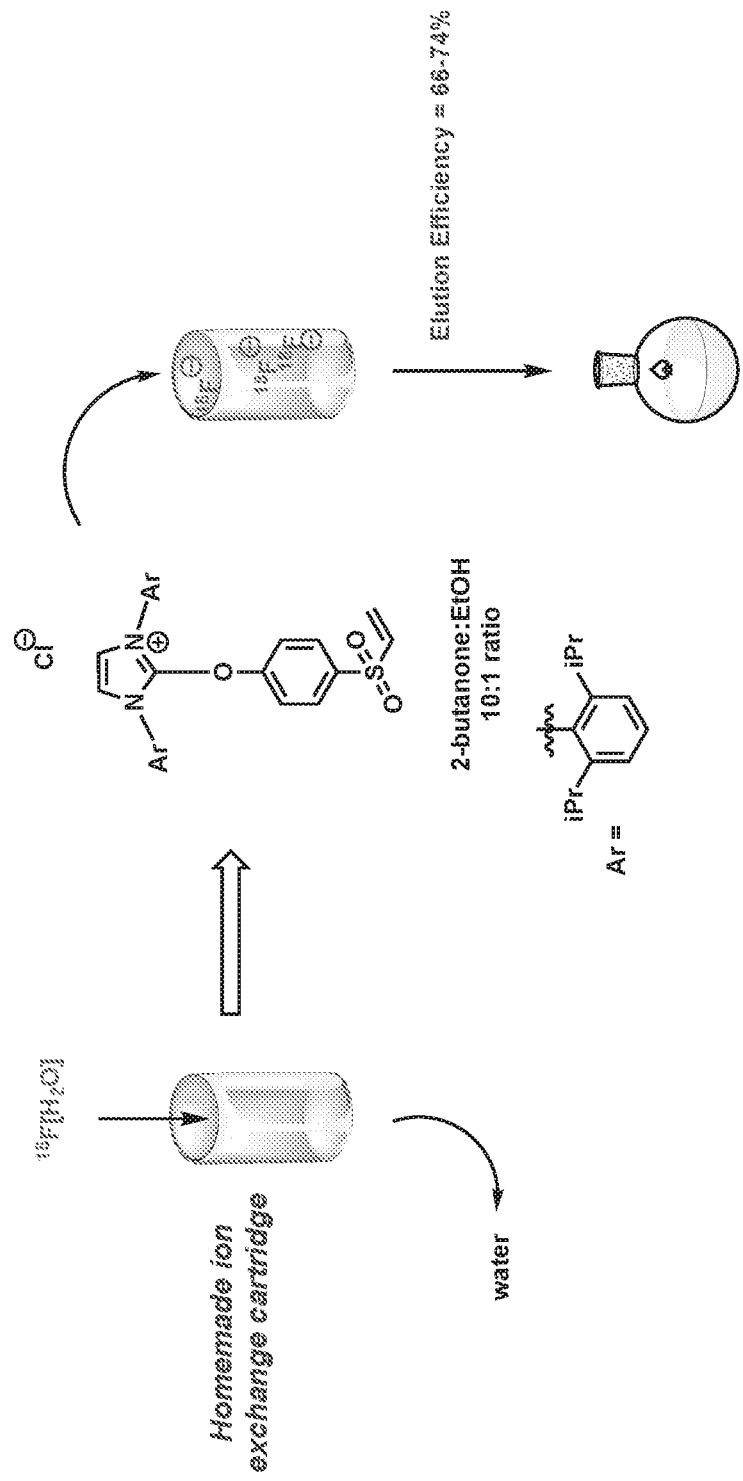
FIGS. 5A and 5B. Cartoon schematics showing: labelling of precursor 8 passed through cartridge and collected in a vial (FIG. 5A); and chemistry in reaction vial (FIG. 5B).

$^{18}$F-Labeling Reaction:

[$^{18}$F]fluoride was passed through a homemade ion exchange cartridge and the cartridge was washed with 2-butanone:ethanol 10:1 (1 mL) which was collected in a waste container. Labeling precursor 8 was dissolved in 2-butanone:ethanol (10:1) and passed through the cartridge and collected in a vial (see, e.g. cartoon schematic shown in FIG. 5A). Elution efficiency was measured to be 66-74%.

Figure 5B:
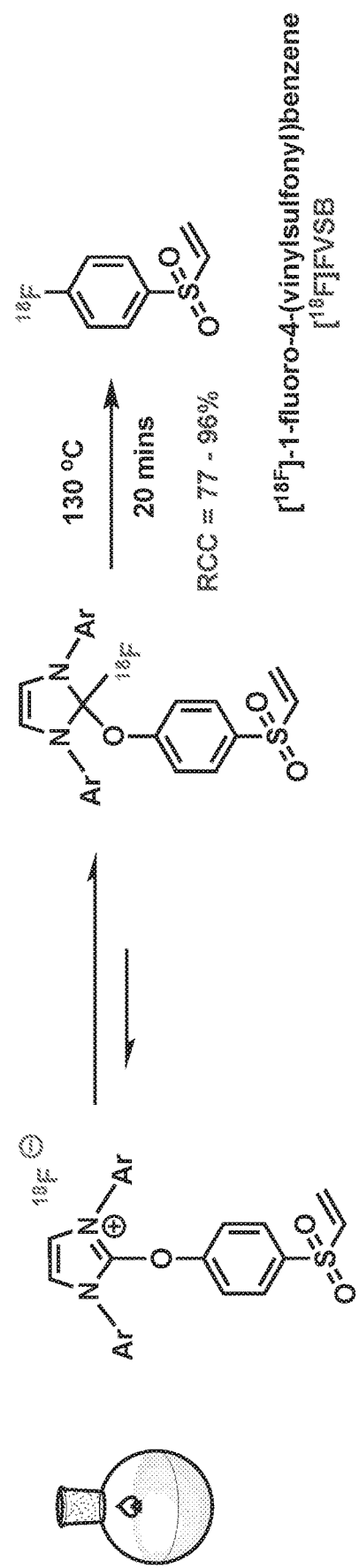

The reaction vial was sealed and allowed to stir at 130° C. for 20 mins. The reaction mixture was cooled and analyzed. Radiochemical conversions (RCC) were determined by radio-Thin Layer Chromatography (radio-TLC) and were found to be 70-96% (see, e.g. cartoon schematic shown in FIG. 5B). The identity of [$^{18}$F]FVSB was confirmed by radio-HPLC via co-injection with the 19F reference standard.

Cysteine Bioconjugation in Illustrative Working Embodiment:

The cooled reaction mixture containing crude [$^{18}$F]FVSB was added to a vial containing water (4.5 mL). The aqueous reaction solution was passed through a C18 SPE cartridge, water was passed through the cartridge to remove any remaining polar impurities. Repeat this process again by adding 5 mL water into the vial and passed through a C18 SPE cartridge.

The [$^{18}$F]FVSB was eluted from the C18 cartridge with methanol and a protected cysteine amino acid was added in MeOH containing sodium acetate. The reaction was stirred at 30° C. for 15 mins and subjected to purification via reverse phase semi-preparative HPLC. The radiolabeled cysteine was obtained in 89-93% yield based on semi-preparative HPLC. Identity of the radiolabeled product was confirmed by radio-HPLC via co-injection with the $^{19}$F reference standard.

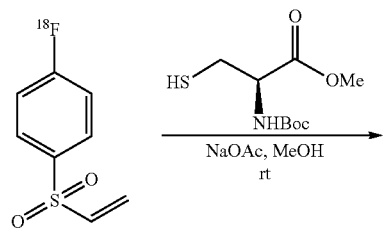

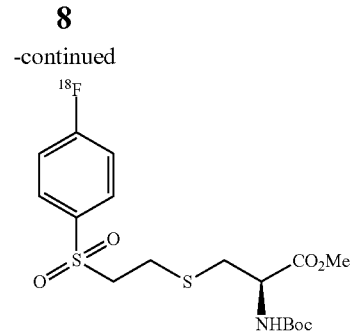

Composition: The chemical compound used to illustrate a typical working embodiment of the invention (1-fluoro-4-(vinylsulfonyl)benzene) is a known chemical structure. However, the radioisotope [$^{18}$F]-1-fluoro-4-(vinylsulfonyl)benzene is a new compound which, to our knowledge, has never been reported before. Likewise, use of the $^{18}$F-radioisotope of compounds such as those disclosed herein for fluorine-18 labeling of biomolecules and/or small molecules for applications in PET imaging has never been reported before.

TABLE 1

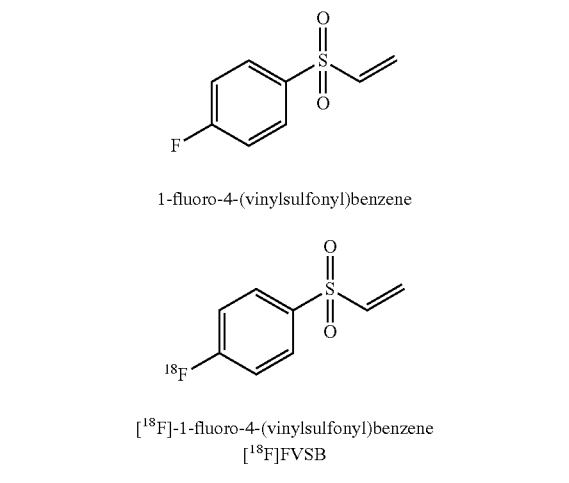

1-fluoro-4-(vinylsulfonyl)benzene

[$^{18}$F]-1-fluoro-4-(vinylsulfonyl)benzene
[$^{18}$F]FVSB

Illustrative Precursor Complex Embodiments for the Vinyl Sulfone Embodiments Shown Above:

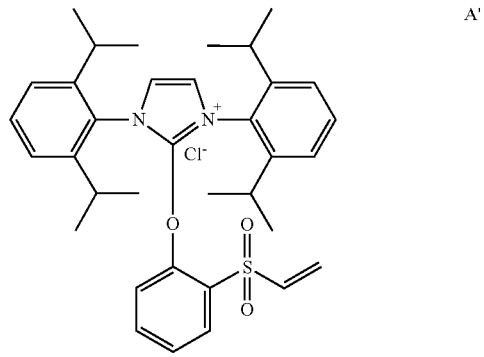

TABLE 1-continued

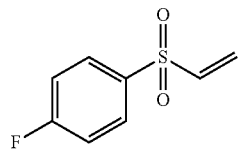

1-fluoro-4-(vinylsulfonyl)benzene

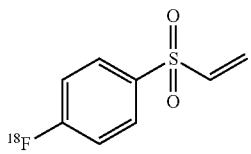

[$^{18}$F]-1-fluoro-4-(vinylsulfonyl)benzene
[$^{18}$F]FVSB

Illustrative Precursor Complex Embodiments for the Vinyl Sulfone Embodiments Shown Above:

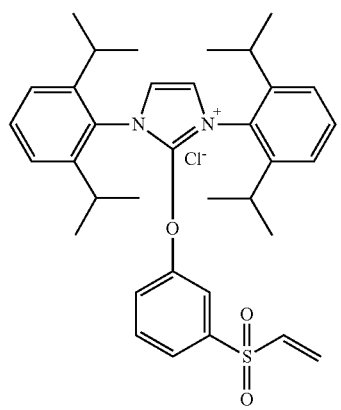

B'

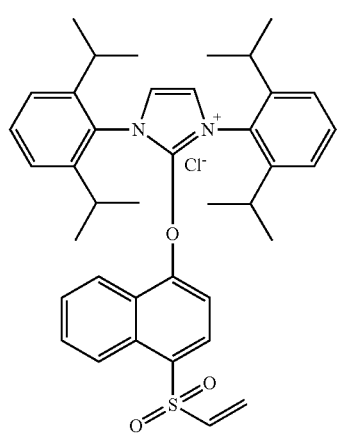

C'

TABLE 1-continued

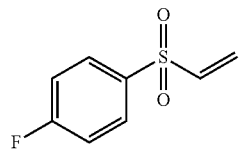

1-fluoro-4-(vinylsulfonyl)benzene

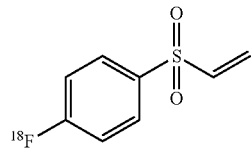

[$^{18}$F]-1-fluoro-4-(vinylsulfonyl)benzene
[$^{18}$F]FVSB

Illustrative Precursor Complex Embodiments for the Vinyl Sulfone Embodiments Shown Above:

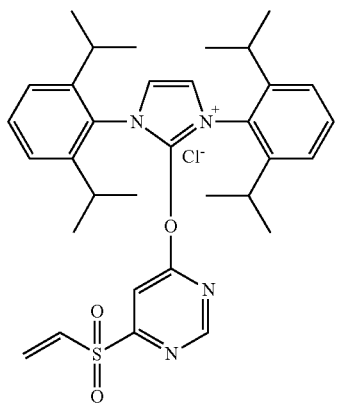

D'

E'

TABLE 1-continued

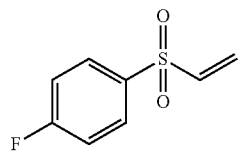

1-fluoro-4-(vinylsulfonyl)benzene

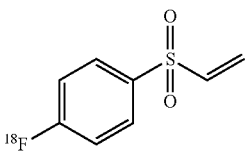

[$^{18}$F]-1-fluoro-4-(vinylsulfonyl)benzene
[$^{18}$F]FVSB

Illustrative Precursor Complex Embodiments for the Vinyl Sulfone Embodiments Shown Above:

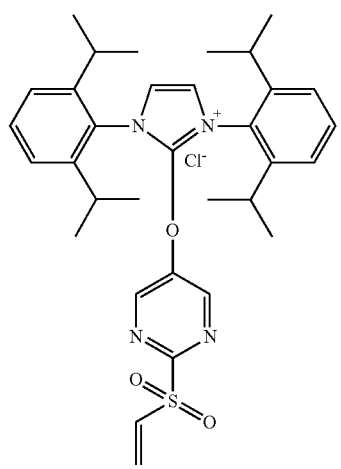

F'

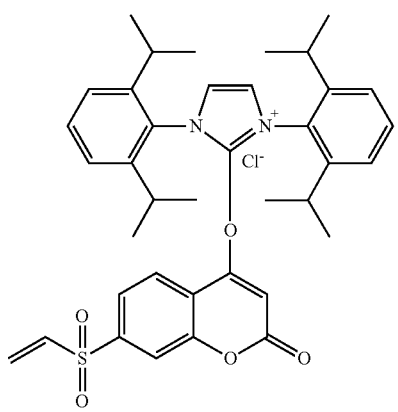

G'

TABLE 1-continued

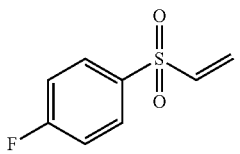

1-fluoro-4-(vinylsulfonyl)benzene

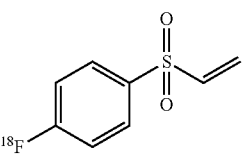

[$^{18}$F]-1-fluoro-4-(vinylsulfonyl)benzene
[$^{18}$F]FVSB

Illustrative Precursor Complex Embodiments for the Vinyl Sulfone Embodiments Shown Above:

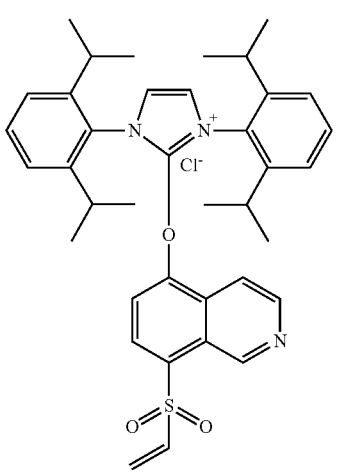

H'

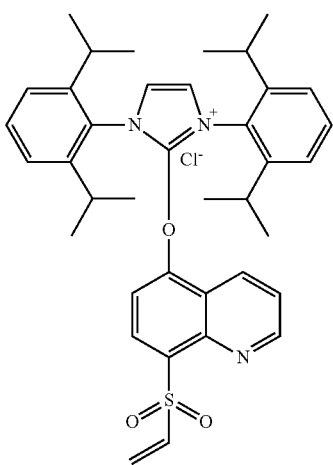

I'

TABLE 1-continued

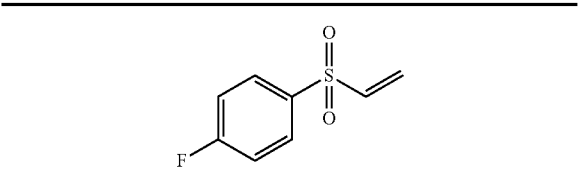

1-fluoro-4-(vinylsulfonyl)benzene

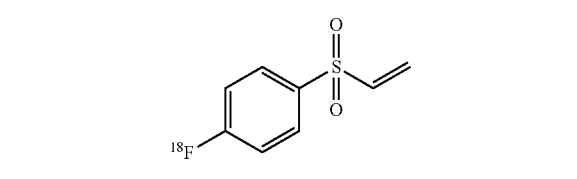

[$^{18}$F]-1-fluoro-4-(vinylsulfonyl)benzene
[$^{18}$F]FVSB

Illustrative Precursor Complex Embodiments for the Vinyl Sulfone Embodiments Shown Above:

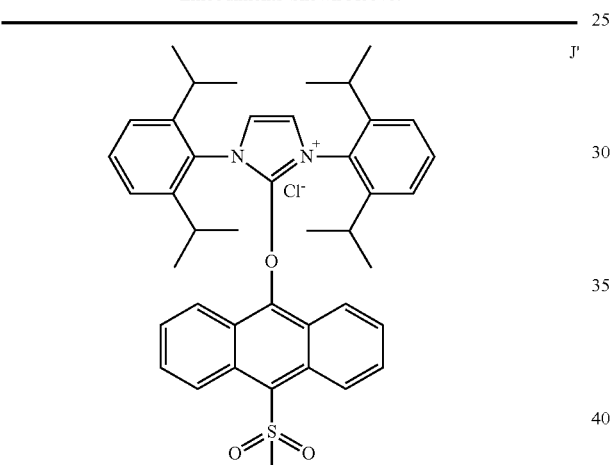

J'

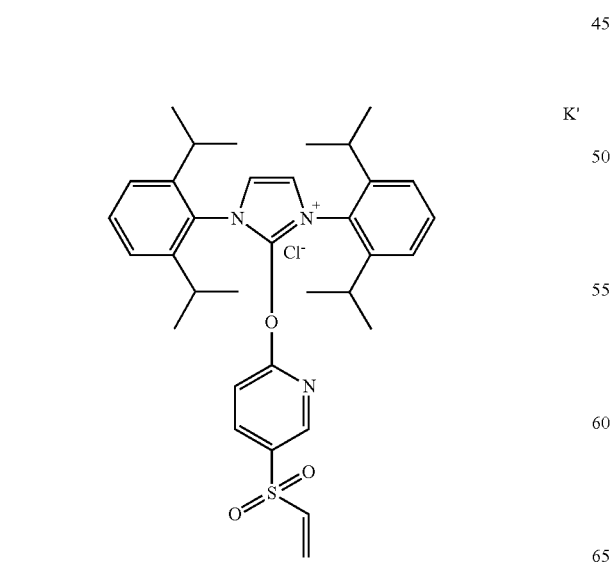

K'

TABLE 1-continued

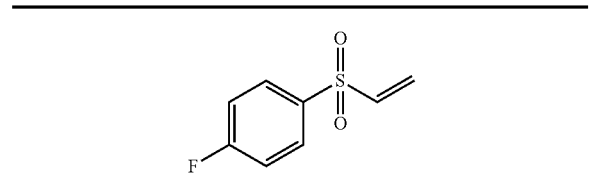

1-fluoro-4-(vinylsulfonyl)benzene

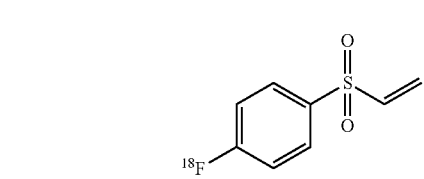

[$^{18}$F]-1-fluoro-4-(vinylsulfonyl)benzene
[$^{18}$F]FVSB

Illustrative Precursor Complex Embodiments for the Vinyl Sulfone Embodiments Shown Above:

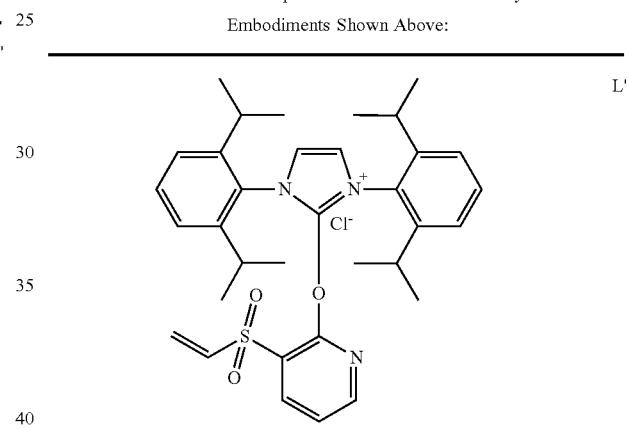

L'

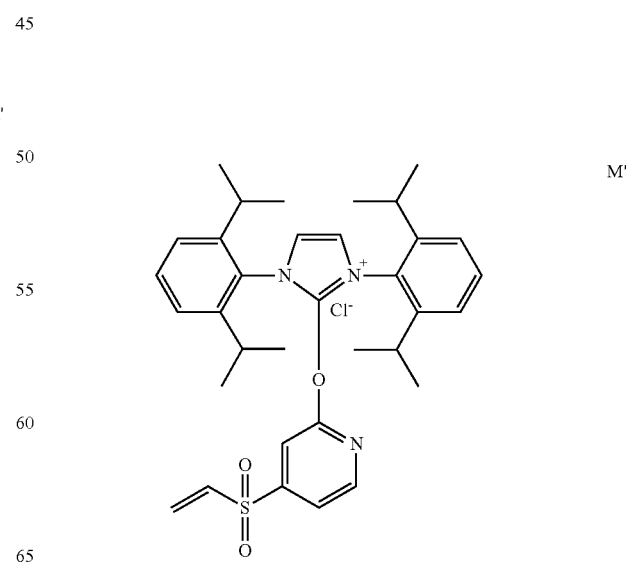

M'

TABLE 1-continued
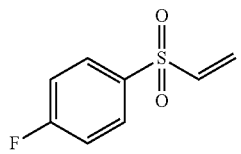
1-fluoro-4-(vinylsulfonyl)benzene
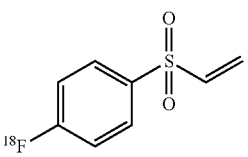
[¹⁸F]-1-fluoro-4-(vinylsulfonyl)benzene
[¹⁸F]FVSB
Illustrative Precursor Complex Embodiments for the Vinyl Sulfone Embodiments Shown Above:
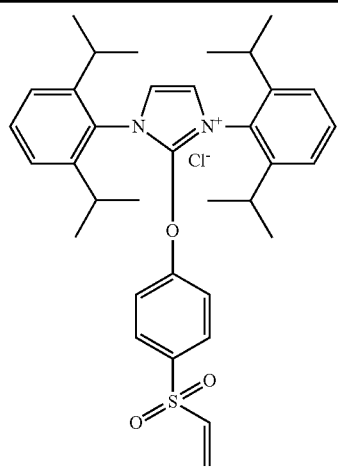
N'
TABLE 2
Illustrative Vinyl Sulfone Embodiments:
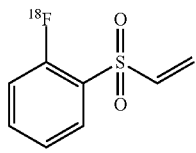  A
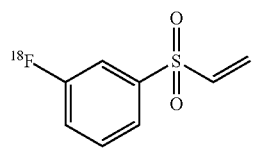  B
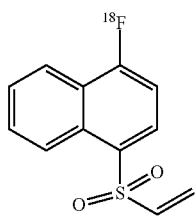 [SMILES: C=CS(=O)(=O)c1ccc([18F])c2ccccc12]  C
TABLE 2-continued
Illustrative Vinyl Sulfone Embodiments:
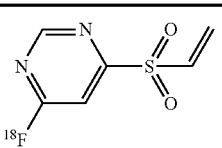  D
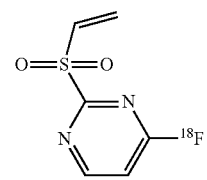  E
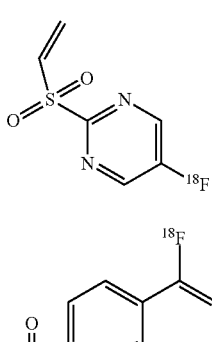  F
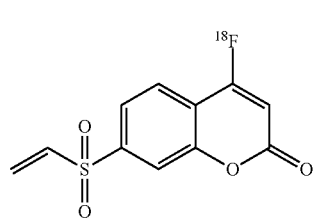 [SMILES: C=CS(=O)(=O)c1ccc2c([18F])cc(=O)oc2c1]  G
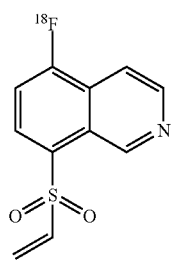 [SMILES: C=CS(=O)(=O)c1ccc([18F])c2ccncc12]  H
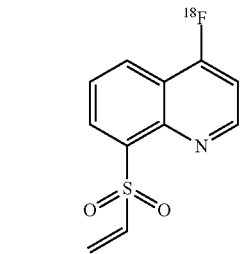 [SMILES: C=CS(=O)(=O)c1cccc2c([18F])ccnc12]  I
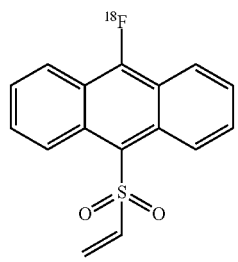 [SMILES: C=CS(=O)(=O)c1c2ccccc2c([18F])c2ccccc12]  J

TABLE 2-continued

Illustrative Vinyl Sulfone Embodiments:

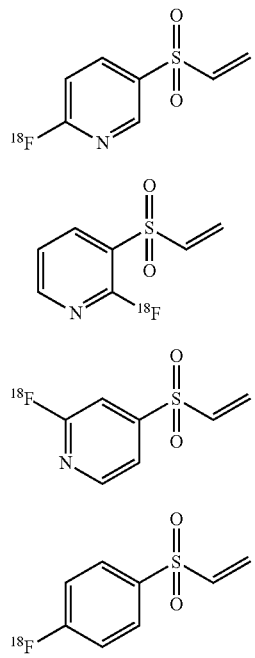

Illustrative Elements for Ion Exchange Cartridges (See Illustrative Embodiment in FIG. 1):

Illustrative Materials:
- Tubing: IDEX 1517L-Tefzel™ (ETFE) Tubing 1/16" OD×0.040" ID.
- Frits: UCT FT20751P-PE Frits for 75 mL Cartridges OD (1.050"), Porosity 20 μm, Thickness 1/8".
- Resin: Biorad MP-1 Anion Exchange Resins.
- Hole punch: Integra Miltex Disposable Biopsy Punch 1 mm.

Illustrative Procedure to Construct Cartridge:
1. Cut a short piece of tubing.
2. Use hole punch to cut out a small round frit then insert it to the tubing.
3. Use finger to squeeze the tubing at the one side of frit to secure frit stays in place 104. Put resin into an Eppendorf vial with DI water to form resin slurry.
5. Use vacuum line to transfer the resin slurry into the tube—the resin will pack into the tube on the other side of the frit and the vacuum will remove the water.
6. Cut another small round frit with hole punch and slowly move it into the tube till it reaches resin.
157. Squeeze the other side of tubing to secure the second frit.
8. Use male and female luer lock adaptors on each end of the tube to connect to the lines in an automated radiosynthesizer to trap/elute of fluorine-18.

EXAMPLES

Figure 6:
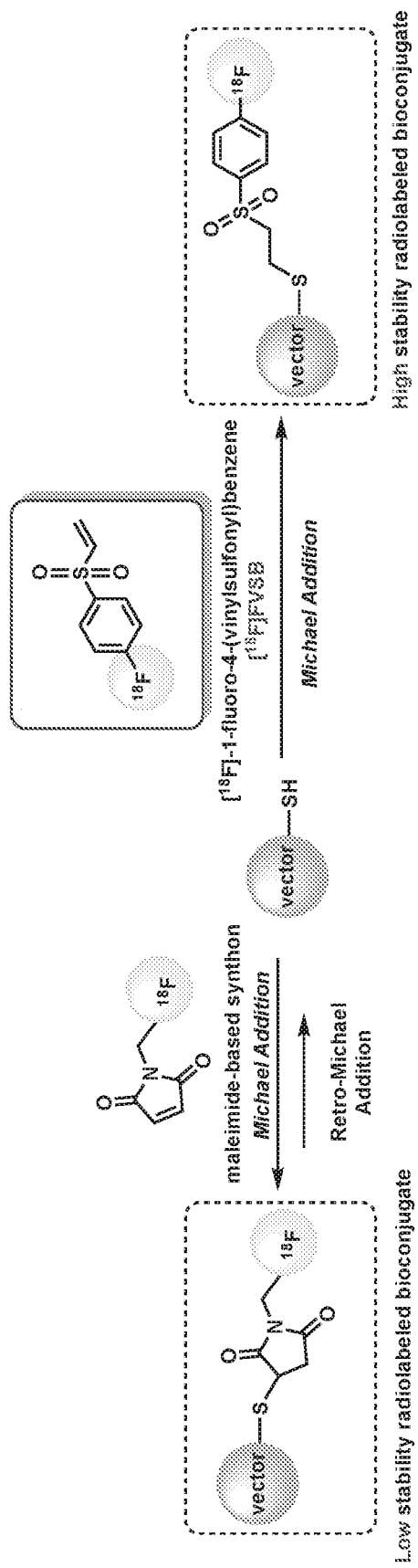
FIG. 6. Cartoon schematic of Michael addition and Retro-Michael addition reactions.

Example 1: One-Step Synthesis of a Thiol-Reactive Synthon for Mild and Selective $^{18}$F-Labeling of Biomolecules Non-invasive imaging modalities such as positron emission tomography (PET) can provide highly sensitive and quantitative imaging of specific target antigens in living organisms and patients. Peptides and proteins are important diagnostic tools due to their selectivity towards overexpressed cell surface receptors of many cancers, which can be exploited for targeting purposes. Selective bioconjugation reactions for $^{18}$F-labeling of peptides and proteins have largely focused on the modification of cysteine residues. Currently, the gold-standard for $^{18}$F-labeling via thiol-reactive bioconjugations are conducted with maleimide-based synthons. These reactions enable a site-selective thiol linkage via Michael addition between a sulfhydryl and a maleimide group, forming a succinimidyl thioether linkage. However, the conjugate exhibits low stability in physiological conditions and is susceptible to a Retro-Michael addition reaction, regenerating back the free sulfhydryl and the maleimide synthon (see, e.g. cartoon schematic shown in FIG. 6). In this reversible reaction, other thiol-containing molecules have the opportunity to react with the maleimide and thereby to join the fluorine-18 radioisotope with unwanted side-products (see, e.g. Koniev, O.; Wagner, A., Developments and recent advancements in the field of endogenous amino acid selective bond forming reactions for bioconjugation. Chem. Soc. Rev. 2015, 44 (15), 5495-5551).

We report a $^{18}$F-labeled vinyl sulfone, [$^{18}$F]-1-fluoro-4-(vinylsulfonyl)benzene ([$^{18}$F]FVSB), as a thiol-reactive synthon for the site-specific radiolabeling of small molecules or biomolecules, for applications in PET molecular imaging. One-step synthesis of [$^{18}$F]FVSB was achieved in up to 96% radiochemical conversion. No azeotropic drying of [$^{18}$F]fluoride is needed and [$^{18}$F]FVSB can be used without HPLC purification for subsequent bioconjugation. [$^{18}$F]FVSB displays rapid and selective reactivity with thiol-containing peptides and was utilized for the site-specific modification and $^{18}$F-labeling of a model neuropeptide, [D-Ala$^2$, D-Leu$^5$]-Enkephalin.

We anticipate the numerous advantages of [$^{18}$F]FVSB over other thiol-reactive synthons, particularly the rapid reactivity and improved stability in aqueous environments, will facilitate extensive utility of this approach for preparation and evaluation of $^{18}$F-labeled peptides and proteins for molecular imaging PET probes.

Example 2; Radiofluorination to Obtain [$^{18}$F]-1-Fluoro-4-(Vinylsulfonyl)Benzene ([$^{18}$F]FVSB) and Peptide Conjugation To illustrative an embodiment of the invention, [$^{18}$F]FVSB was used to form a $^{18}$F labelled peptide ([D-Ala$^2$, D-Leu$^5$]-Enkephalin).

In this embodiment, radiochemical conversion of vinyl sulfone precursor to afford [$^{18}$F]FVSB (reaction scheme shown below).

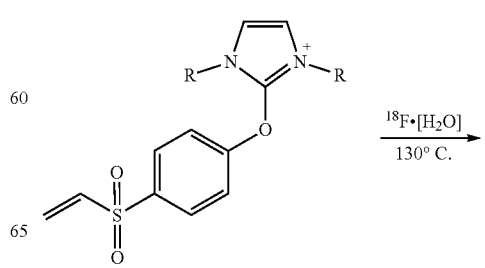

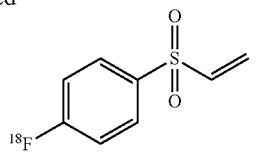

5

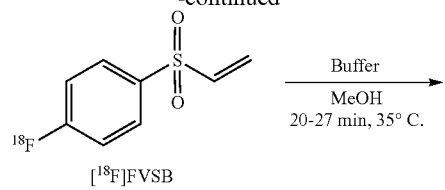

[18F]FVSB

A.) Synthesis of [18F]FVSB:

One-step synthesis of [18F]FVSB was achieved following a deoxyfluorination of phenols methodology reported in literature1 in up to 96% radiochemical conversion. No azeotropic drying of [18F]fluoride is needed and [18F]FVSB can be used without HPLC purification for subsequent bioconjugation.

Figure 7:
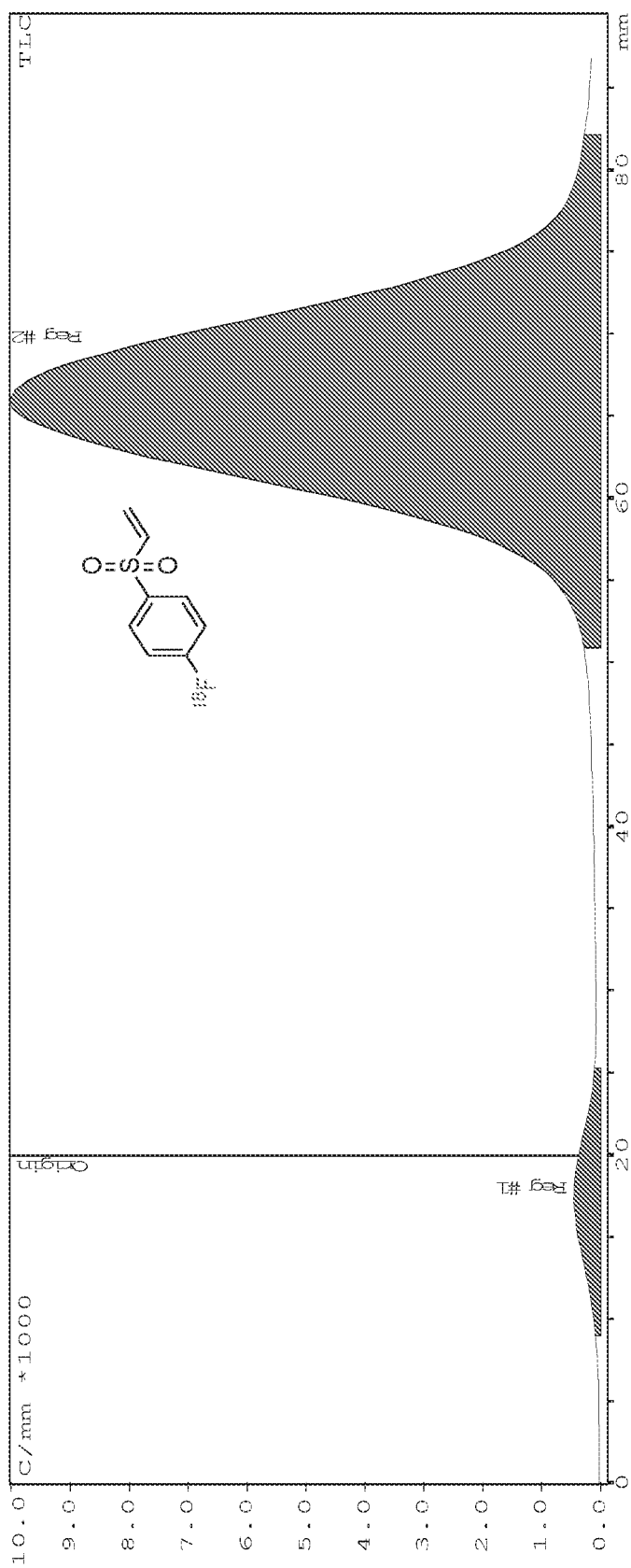
FIG. 7. Graphed data showing Radio-TLC of fluorination of vinyl sulfone precursor to afford [$^{18}$F]FVSB in high radiochemical conversion (reaction scheme shown above radio-TLC trace).
Figure 8:
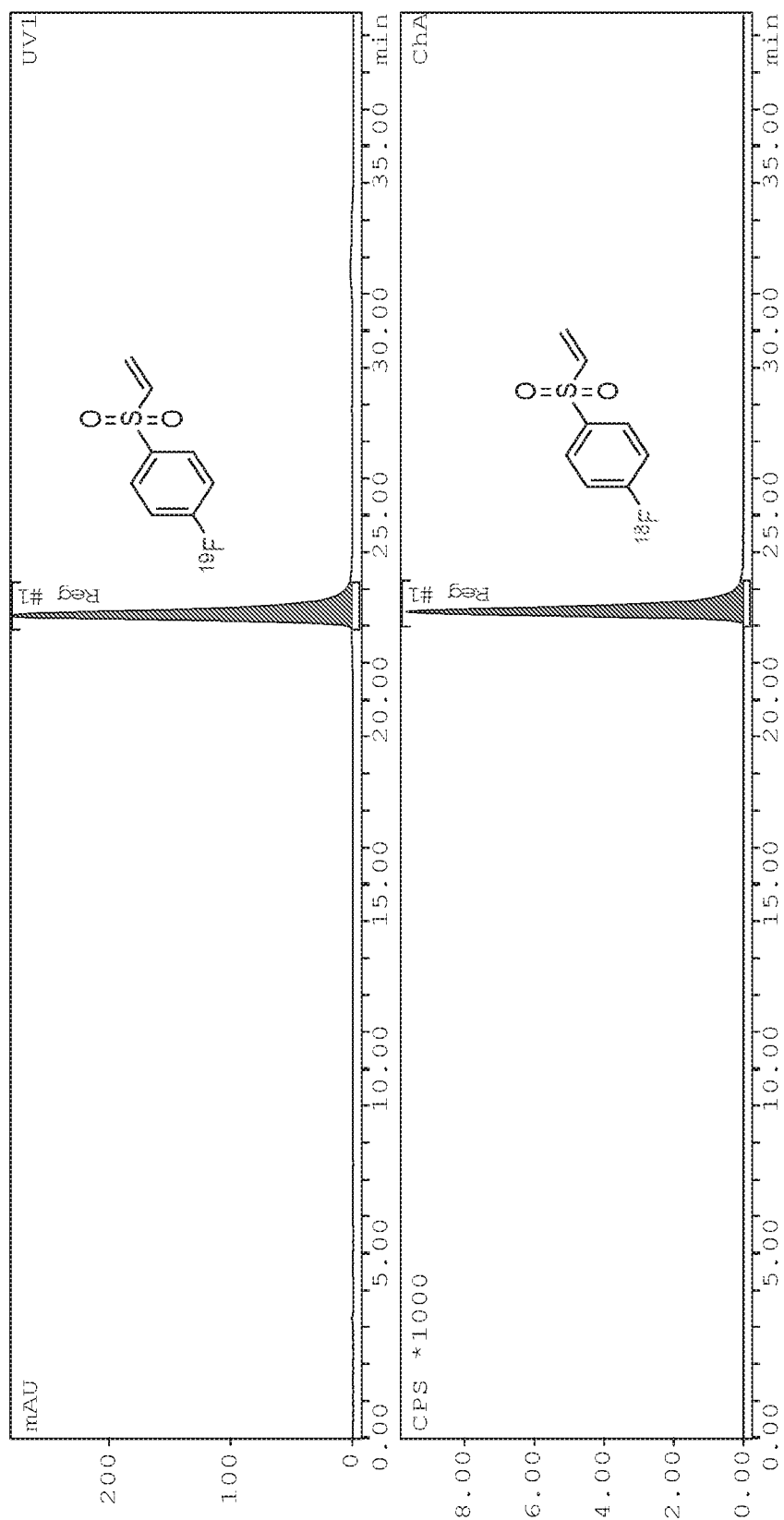
FIG. 8. Graphed data showing Radio-HPLC with 254 nm UV trace of reference standard (top panel) and radioactivity trace of purified [$^{18}$F]FVSB product (bottom panel), coinjected.

Graphed data presented in FIG. 7 shows Radio-TLC of fluorination of vinyl sulfone precursor to afford [18F]FVSB in high radiochemical conversion. Graphed data presented in FIG. 8 shows Radio-HPLC with 254 nm UV trace of reference standard (top panel) and radioactivity trace of purified [18F]FVSB product (bottom panel), coinjected.

B.) Bioconjugation with Peptides:

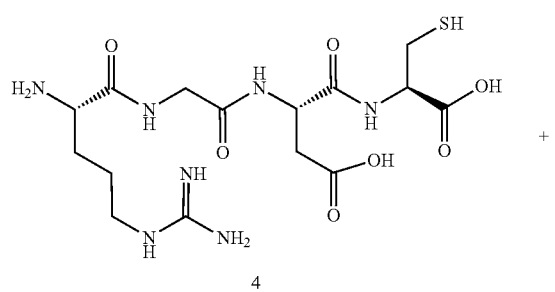

4

+

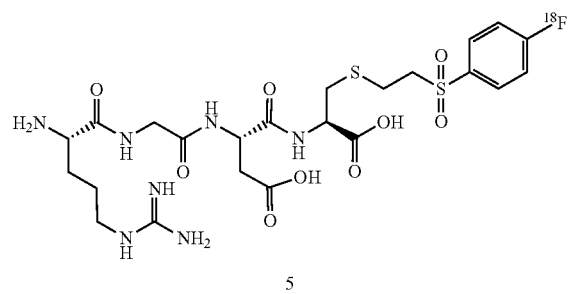

5

As shown in the above Scheme, [18F]FVSB was synthesized and directly used (no HPLC needed) for conjugation to peptide 4. Peptide conjugate 5 was obtained after 20-27 min at 35° C. with >96% conversion, as determined by HPLC analysis.

The reaction scheme for [18F]FVSB labelling of D-Ala[2], D-Leu[5]-Enkephalin is as follows:

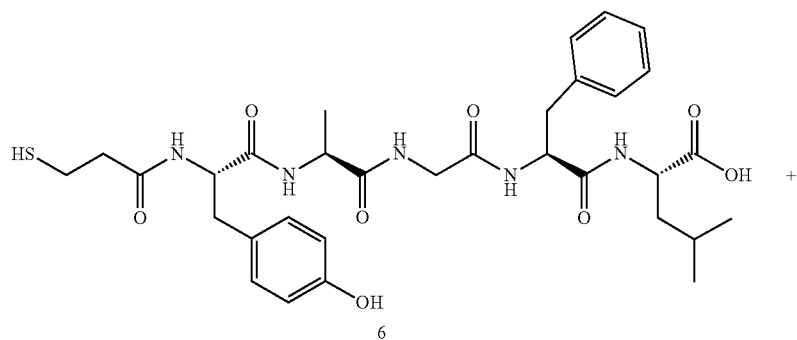

6

+

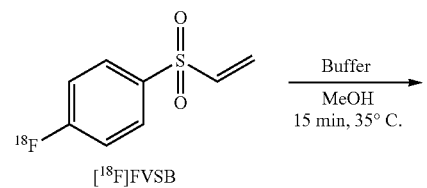

[18F]FVSB

-continued

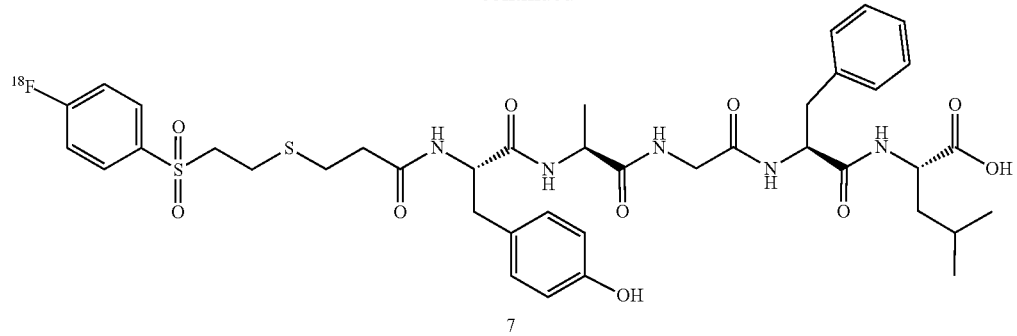

7

The peptide [D-Ala$^2$, D-Leu$^5$]-Enkephalin is a selective delta-opioid receptor agonist which displays protective effects towards the preservation of neurologic function and neuronal damage against hypoxic or ischemic induced brain injury. A thiol-functionalized peptide conjugate 6 was prepared in high yield and was subjected to radiofluorination via conjugation with [$^{18}$F]FVSB. Clean conversion (>93%) to [$^{18}$F]Enkephalin analogue 7 was achieved after 15 min at 35° C., as determined by HPLC analysis.

Figure 9:
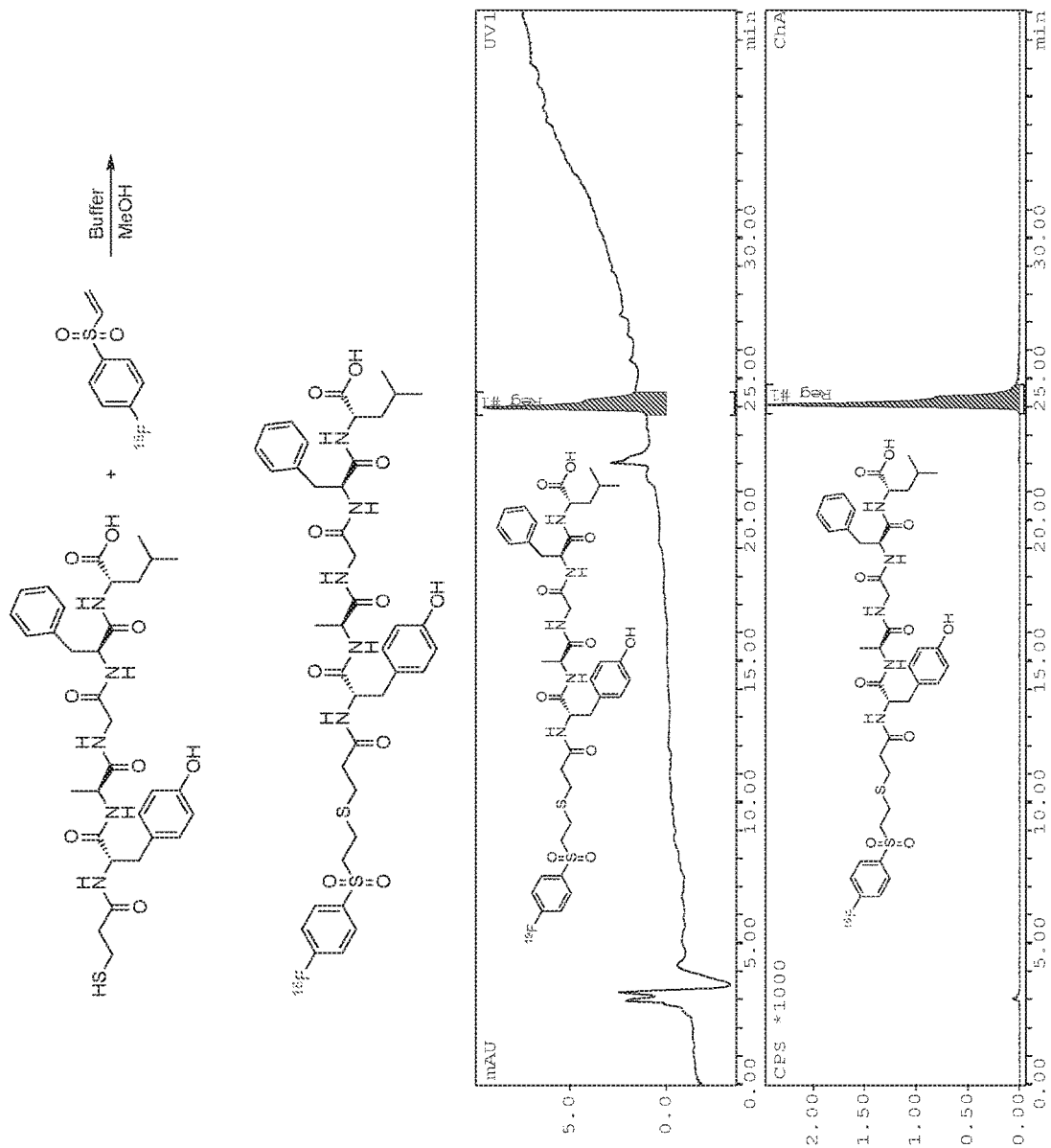
FIG. 9. Cartoon schematic of [D-Ala[2], D-Leu[5]]-Enkephalin labelling above two panels of graphed data showing HPLC: UV trace of purified $^{18}$F-labeled peptide, [D-Ala[2], D-Leu[5]]-Enkephalin, (bottom panel) coinjected with reference standard (top panel).

FIG. 9 shows two panels of graphed data showing HPLC: UV trace of purified $^{18}$F-labeled peptide, [D-Ala$^2$, D-Leu$^5$]-Enkephalin, (bottom panel) coinjected with reference standard (top panel).

C.) Illustrative Benefits of [$^{18}$F]FVSB for Thiol-Reactive Labeling:

There are a number of benefits of [$^{18}$F]FVSB for thiol-reactive labeling including: one step $^{18}$F-fluorination (as compared to [$^{18}$F]FBEM which involves at least 3 steps); an increased stability over conventional maleimide labelling; the fact that no HPLC is needed (the [$^{18}$F]FVSB and associated molecules disclosed herein can be used essentially in a crude form); a high rate of radiochemical conversion (RCC); no azeotropic drying of [$^{18}$F]fluoride is necessary; no base/additives are needed; and also that the synthesis is easily automated.

CONCLUSION

This concludes the description of the illustrative embodiments of the present invention. The foregoing description of one or more embodiments of the invention has been presented for the purposes of illustration and description. It is not intended to be exhaustive or to limit the invention to the precise form disclosed. Many modifications and variations are possible in light of the above teaching.

All publications mentioned herein are incorporated herein by reference to disclose and describe aspects, methods and/or materials in connection with the cited publications.

The invention claimed is:

1. A composition of matter comprising at least one compound selected from A', B', C', D', E', F', G', H', I', J', K', L', M' and N':

A'

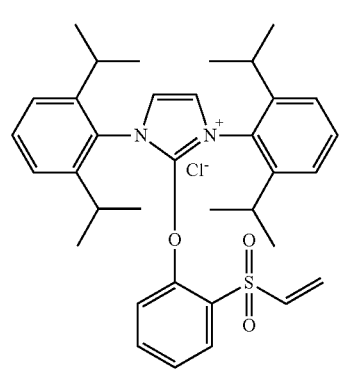

B'

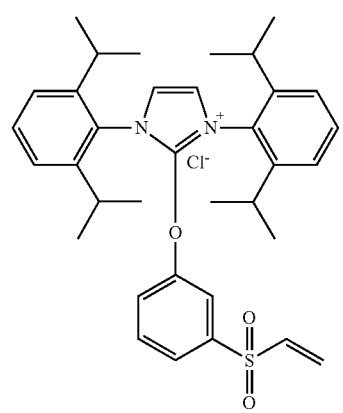

C'

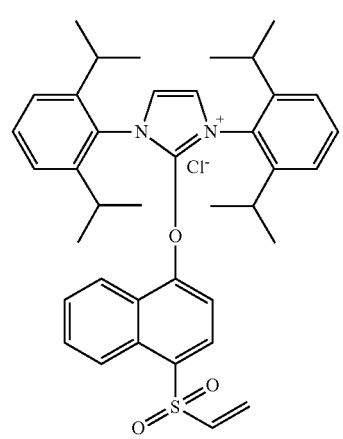

D'
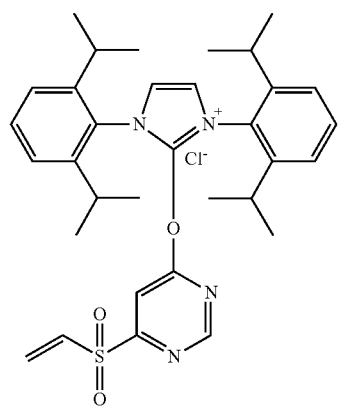
E'
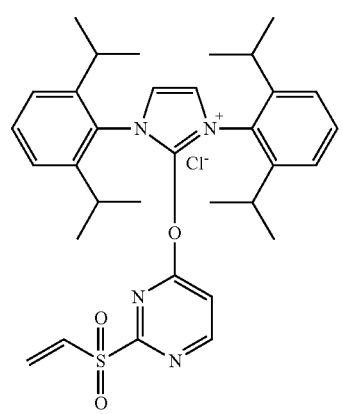
F'
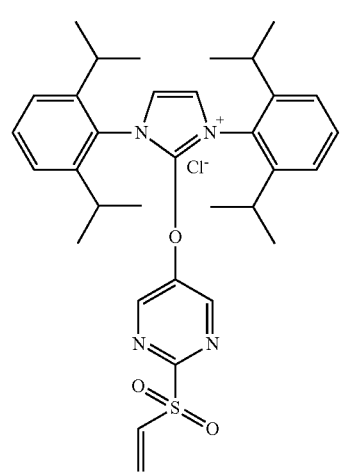
G'
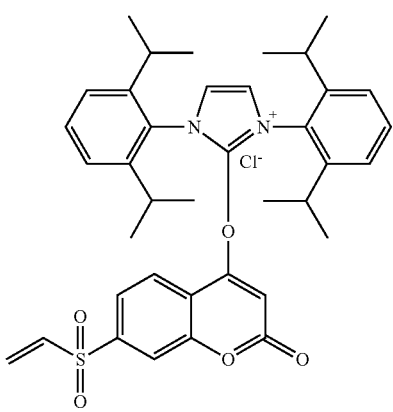
H'
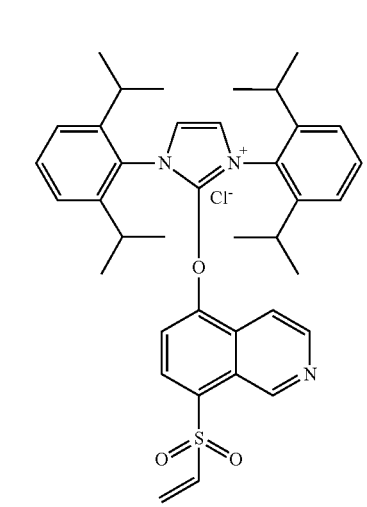
I'
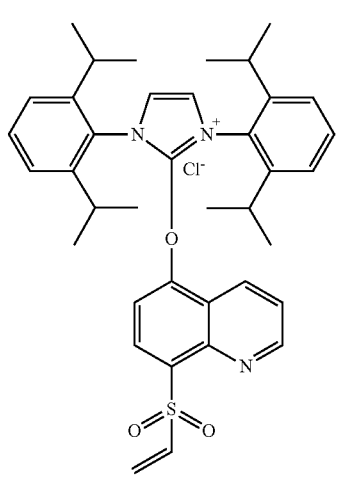

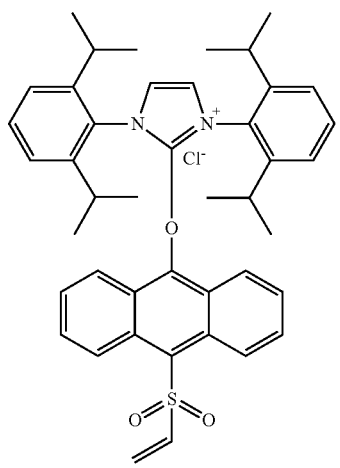

J'

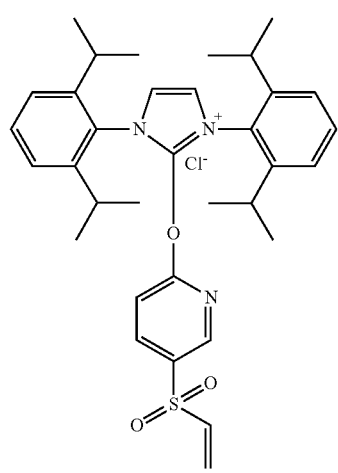

K'

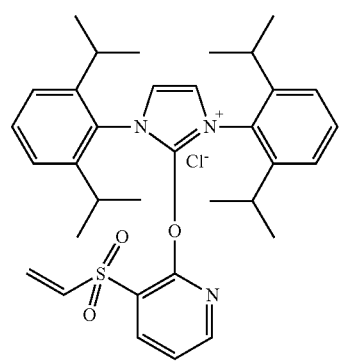

L'

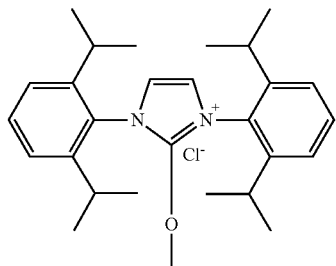

M'

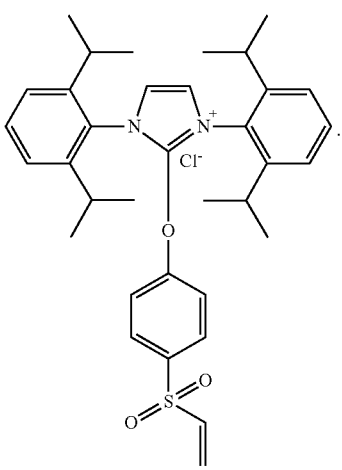

N'

2. The composition of claim 1, wherein:

the compound is in a powdered form;

the compound comprises at least 90% of the composition; and/or the composition is disposed within a container of a kit.

3. The composition of claim 1, further comprising an organic solvent.

4. The composition of claim 1, further comprising a [$^{18}$F]fluoride molecule.

5. A composition of matter comprising at least one compound selected from A, B, C, D, E, F, G, H, I, J, K, L, M and N:

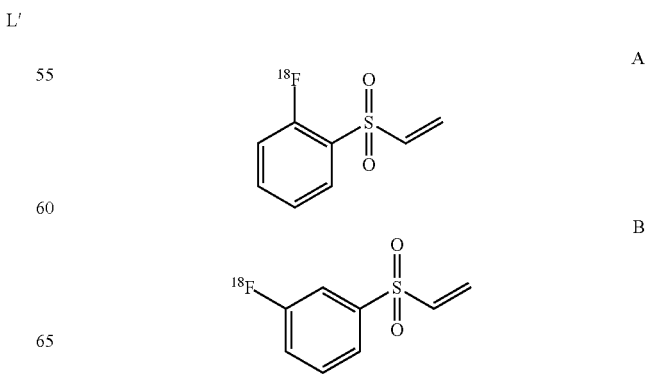

C 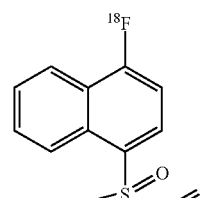

D 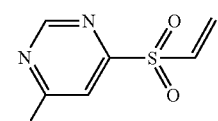

E 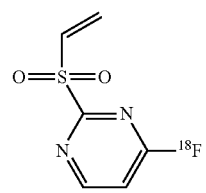

F 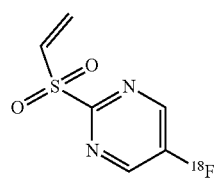

G 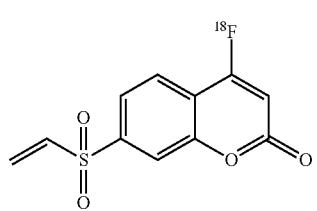

H 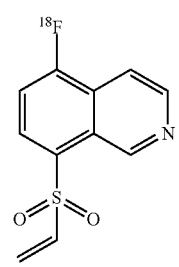

I 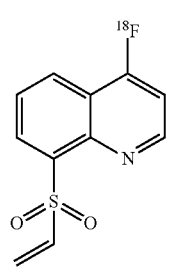

J 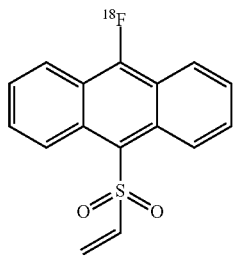

K 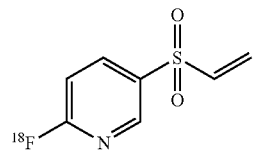

L 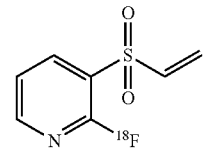

M 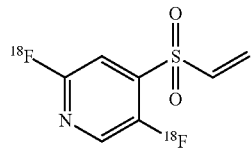

N 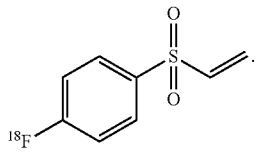

6. The composition of claim 5, further comprising a biomolecule having a —SH moiety.

7. The composition of claim 6, wherein the biomolecule comprises a peptide, a protein, antibody or a sugar.

8. A method of making a $^{18}$F labelled vinyl sulfone comprising:
combining a [$^{18}$F]fluoride radionuclide with at least one compound of claim 1;
performing a fluorination reaction so that a $^{18}$F labelled vinyl sulfone is made.

9. A method of coupling a $^{18}$F moiety to a biomolecule to form a $^{18}$F-biomolecule conjugate comprising:
combining the biomolecule with at least one compound of claim 5;
performing a Michael addition reaction so that the $^{18}$F moiety is coupled to the biomolecule, thereby forming a $^{18}$F-biomolecule conjugate.

10. The method of claim 9, wherein the biomolecule comprises a peptide, a protein or a sugar.

11. The method of claim 9, further comprising using the $^{18}$F-biomolecule conjugate in a positron emission tomography process to image an in vivo environment.

12. The method of claim 11, wherein the in vivo environment is in a patient diagnosed with a disease or pathology.

13. The method of claim 12, wherein the disease or pathology is one characterized by disregulated cellular growth.

14. A kit for use in a positron emission tomography methodology comprising:

a container comprising the composition of claim 1.

15. The kit of claim 14, wherein:

the compound is in a powdered form; and/or the compound comprises at least 90% of the composition.

16. The kit of claim 14, further comprising an ion exchange cartridge.

17. The kit of claim 16, wherein the ion exchange column comprises from 2 to 5 milligrams of a resin composition.

18. The kit of claim 14, further including a container comprising a solvent.

* * * * *